United States Patent
Ezra et al.

(10) Patent No.: US 7,177,853 B1
(45) Date of Patent: Feb. 13, 2007

(54) CACHE MANAGEMENT VIA STATISTICALLY ADJUSTED TIME STAMP QUEUE

(75) Inventors: Josef Ezra, Ashland, MA (US); Yechiel Yochai, Brookline, MA (US); Daniel Lambright, Watertown, MA (US); Sachin More, Marlborough, MA (US); Yedidia Atzmony, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 709 days.

(21) Appl. No.: 10/080,321

(22) Filed: Feb. 21, 2002

(51) Int. Cl.
*G06F 17/30* (2006.01)

(52) U.S. Cl. .......................................................... 707/1
(58) Field of Classification Search ..................... 707/1, 707/8, 10, 206, 200, 2; 709/231, 224; 711/118; 710/310
See application file for complete search history.

(56) References Cited

U.S. PATENT DOCUMENTS

| | | | |
|---|---|---|---|
| 5,206,939 A | 4/1993 | Yanai et al. | |
| 5,381,539 A | 1/1995 | Yanai et al. | |
| 5,592,432 A | 1/1997 | Vishlitzky et al. | |
| 5,778,394 A | 7/1998 | Galtzur et al. | |
| 5,784,699 A * | 7/1998 | McMahon et al. | 711/171 |
| 5,845,147 A | 12/1998 | Vishlitzky et al. | |
| 5,857,208 A | 1/1999 | Ofek | |
| 6,338,125 B1 * | 1/2002 | Kopser et al. | 711/150 |
| 6,401,126 B1 * | 6/2002 | Douceur et al. | 709/231 |
| 6,408,163 B1 * | 6/2002 | Fik | 455/3.01 |
| 6,687,798 B1 * | 2/2004 | Thusoo et al. | 711/154 |
| 6,832,297 B2 * | 12/2004 | Pfister et al. | 711/144 |
| 2002/0024830 A1 * | 2/2002 | Yoneda | 365/49 |
| 2003/0061444 A1 * | 3/2003 | Herbst et al. | 711/118 |
| 2004/0078507 A1 * | 4/2004 | Bogin et al. | 710/310 |
| 2004/0170064 A1 * | 9/2004 | Herari et al. | 365/185.29 |

OTHER PUBLICATIONS

Proceedings of the 2001 USENIX Annual Technical Conference, Boston, MA, USA; Jun. 25-30, 2001; "The Multi-Queue Replacement Algorithm for Second Level Buffer Caches" by Zhou et al.
Pending U.S. Appl. No. 09/535,134, filed Mar. 24, 2000, entitled Segmenting Cache to Provide Varying Service Levels.

* cited by examiner

*Primary Examiner*—Etienne P LeRoux
(74) *Attorney, Agent, or Firm*—Muirhead & Saturnelli, LLC

(57) ABSTRACT

Described are techniques and criteria used in connection with cache management. The cache may be organized as a plurality of memory banks in which each memory bank includes a plurality of slots. Each memory bank has an associate control slot that includes groups of extents of tags. Each cache slot has a corresponding tag that includes a bit value indicating the availability of the associated cache slot, and a time stamp indicating the last time the data in the slot was used. The cache may be shared by multiple processors. Exclusive access of the cache slots is implemented using an atomic compare and swap instruction. The time stamp of slots in the cache may be adjusted to indicate ages of slots affecting the amount of time a particular portion of data remains in the cache.

40 Claims, 12 Drawing Sheets

CACHE MANAGEMENT VIA STATISTICALLY ADJUSTED TIME STAMP QUEUE

BACKGROUND

1. Technical Field

This application generally relates to computer data storage, and more particularly to a cache used with computer data storage.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations and also administrative tasks, such as data backup and mirroring operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

Performance of a storage system may be improved by using a cache. In the case of a disk drive system, the cache may be implemented using a block of semiconductor memory that has a relatively lower data access time than the disk drive. Data that is accessed is advantageously moved from the disk drives to the cache so that the second and subsequent accesses to the data may be made to the cache rather than to the disk drives. Data that has not been accessed recently may be removed from the cache to make room for new data. Often such cache accesses are transparent to the host system requesting the data.

Data may be stored in a cache in order to increase efficiency. However, there can be a cost associated with performing cache management operations, such as storing and retrieving data from the cache, in particular if the cache is locked for exclusive access in a particular implementation.

One technique for implementing a cache is to store the data in blocks and link each of the blocks together in a doubly linked ring list referred to herein as a replacement queue. Each block of the replacement queue represents a block of data from a logical disk unit. The blocks or slots are placed in the doubly linked ring list in the order in which they are retrieved from the disk. A pointer may point to the block that was most recently added to the list. Thus, when a new block is to be added to the cache within the replacement queue, the structure of the replacement queue, in combination with the head pointer, may be used to determine the oldest block in the replacement queue that is to be removed to make room for the new block. An implementation of the replacement queue may use both a "head" pointer and a "tail" pointer identifying, respectively, the beginning and end of the replacement queue. The "tail" may determine the oldest block or slot in the replacement queue. Two such pointers may be used in an replacement queue arrangement as it may be desirable in accordance with cache management schemes in which some data may remain permanently in the cache and the "oldest" and "newest" data may not be adjacent to one another.

Cache management techniques are described, for example, in issued U.S. Pat. No. 5,381,539, Jan. 10, 1995, entitled "System and Method for Dynamically Controlling Cache Management", Yanai et al., assigned to EMC Corporation of Hopkinton, Mass., which is herein incorporated by reference, in which a data storage system has a cache controlled by parameters including: (a) a minimum number of data storage elements which must be retrieved and stored in cache memory and used by the system before the cache management system recognizes a sequential data access in progress; (b) the maximum number of tracks or data records which the cache management system is to prefetch ahead; and (c) the maximum number of sequential data elements to be stored in cache before the memory containing the previously used tracks or data records are reused or recycled and new data written to these locations. The cache memory is in a least-recently used circular configuration in which the cache management system overwrites or recycles the oldest or least recently used memory location. The cache manager provides monitoring and dynamic adjustment of the foregoing parameters.

Described in issued U.S. Pat. No. 5,592,432, Jan. 7, 1997, entitled "Cache Management System Using Time Stamping for Replacement Queue", Vishlitzky et al., which is herein incorporated by reference, is a system that includes a cache directory listing data elements in a cache memory and a cache manager memory including a replacement queue and data structures. A cache manager determines which data element should be removed or replaced in the cache memory based on the elapsed time the data element has been in the memory. If the elapsed time is less than a predetermined threshold, the data element will be maintained in the same location in the replacement queue saving a number of cache management operations. The predetermined threshold is established as the average fall through time (FTT) of prior data elements in the memory. A modified least-recently-used replacement procedure uses time stamps indicating real or relative time when a non-write-pending data element was promoted to the tail of the replacement queue, the most-recently used position. Also disclosed is another embodiment in which the number of times the data element is accessed while in the memory is compared to a fixed number. If the data element has been accessed more than the fixed number, it is placed at the tail of the replacement queue ensuring a longer period for the data element in the memory.

Described in U.S. Pat. No. 5,206,939, Apr. 27, 1993, entitled "System and Method for Disk Mapping and Retrieval", Yanai et al, which is herein incorporated by reference, is a device-by-device cache index/directory used in disk mapping and data retrieval.

An embodiment using the foregoing queue may have a drawback in that an exclusive access policy may be enforced using an "expensive" locking mechanism in connection with the queue as a shared resource such that only one process may access and manipulate the queue at a time. Additionally, in connection with performing queue management operations, for example, such as adding elements, the complexity of the queue structure may make it difficult to allow more than one process to manipulate to the data structure at any time. One way to enforce this one-at-a-time access is to use a locking technique that allows a process exclusive access to the queue. However, when multiple processors may need to use the cache, then the exclusive access policy may become a bottleneck.

An embodiment having a complex cache management scheme may also have increased traffic within a system. Accordingly, the number of times that a cache lock operation is performed may also increase.

Thus, it may be desirous and advantageous to have a cache management scheme which is efficient and flexible minimizing the costs associated with accessing a cache.

SUMMARY OF THE INVENTION

In accordance with one aspect of the invention is a method executed in a computer system for cache management within a data storage system comprising: associating a tag with each portion of a shared memory, said tag indicating availability of said each portion for use; performing processing to obtain a portion of said shared memory for a current use, said processing including: making an initial determination, using a tag associated with said portion, whether said portion is available; if said initial determination indicates that said portion is available, subsequently determining whether said tag has been modified since said initial determination, wherein a subsequent determination that said tag has been modified indicates that said portion has been granted for another use since said initial determination of availability and that said portion is not available, and a subsequent determination that said tag has not been modified indicates that said portion has not been granted for another use since said initial determination of availability and is currently available; and if said initial determination indicates that said portion is available and said subsequently determining determines that said tag has not been modified since said initial determination, updating said tag to indicate that said portion associated with said tag is not available and that said portion is being granted for said current use, wherein said subsequently determining and said updating are atomically performed.

In accordance with another aspect of the invention is a computer program product for cache management within a data storage system comprising machine executable code for: associating a tag with each portion of a shared memory, said tag indicating availability of said each portion for use; performing processing to obtain a portion of said shared memory for a current use, said processing including: making an initial determination, using a tag associated with said portion, whether said portion is available; if said initial determination indicates that said portion is available, subsequently determining whether said tag has been modified since said initial determination, wherein a subsequent determination that said tag has been modified indicates that said portion has been granted for another use since said initial determination of availability and that said portion is not available, and a subsequent determination that said tag has not been modified indicates that said portion has not been granted for another use since said initial determination of availability and is currently available; and if said initial determination indicates that said portion is available and said subsequently determining determines that said tag has not been modified since said initial determination, updating said tag to indicate that said portion associated with said tag is not available and that said portion is being granted for said current use, wherein said subsequently determining and said updating are atomically performed.

In accordance with yet another aspect of the invention is a computer system comprising: a shared memory comprising at least one control slot of tags in which each tag corresponds to a portion of said shared memory indicating availability of said portion; a plurality of processors which access said shared memory, each processor accessing portions of said shared memory in accordance with availability indicated by an associated tag; and machine executable code that performs an atomic operation providing exclusive access to said shared memory by a first of said plurality of processors when accessing a portion of said shared memory to update at least one field of a tag in order to update an availability status of said portion.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
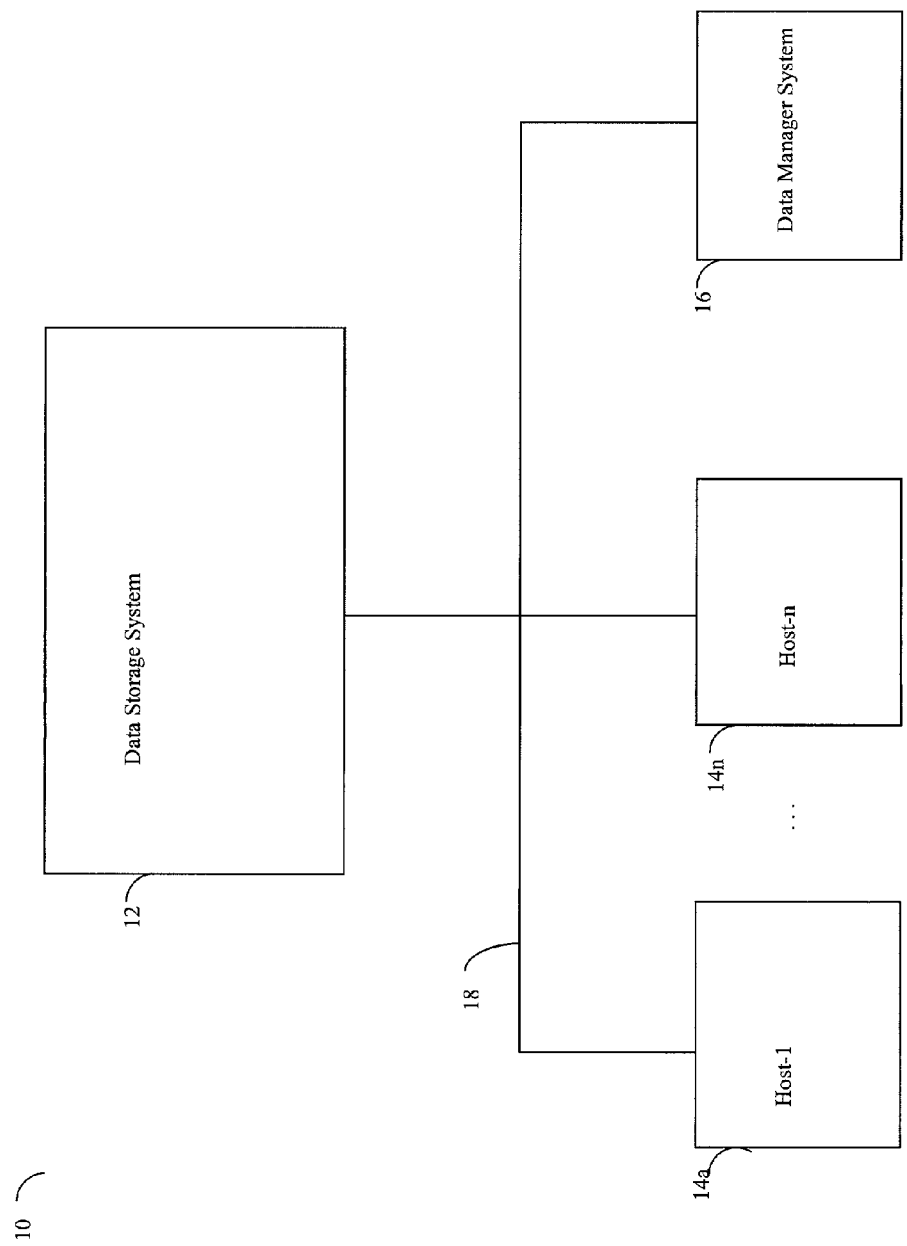
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14*a*–14*n*, and a data manager system 16 through communication medium 18. In this embodiment of the computer system 10, the N hosts 14*a*–14*n* and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a–14n, and the data manager system may access and communicate with the data storage system 12, and may also communicate with others included in the computer system 10.

Each of the host systems 14a–14n, the data manager system 16, and the data storage system 12 included in the computer system 10 may be connected to the communication medium 18 by any one of a variety of connections as may be provided and supported in accordance with the type of communication medium 18. The processors included in the host computer systems 14a–14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a–14n and the data manager system 16, as well as those components that may be included in the data storage system 12 are described herein in more detail, and may vary with each particular embodiment. Each of the host computers 14a–14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a–14n may issue a data request to the data storage system 12 to perform a data operation. For example, an application executing on one of the host computers 14a–14n may perform a backup, mirroring or other administrative operation and may do so while performing data requests to the data storage system 12.

Figure 2:
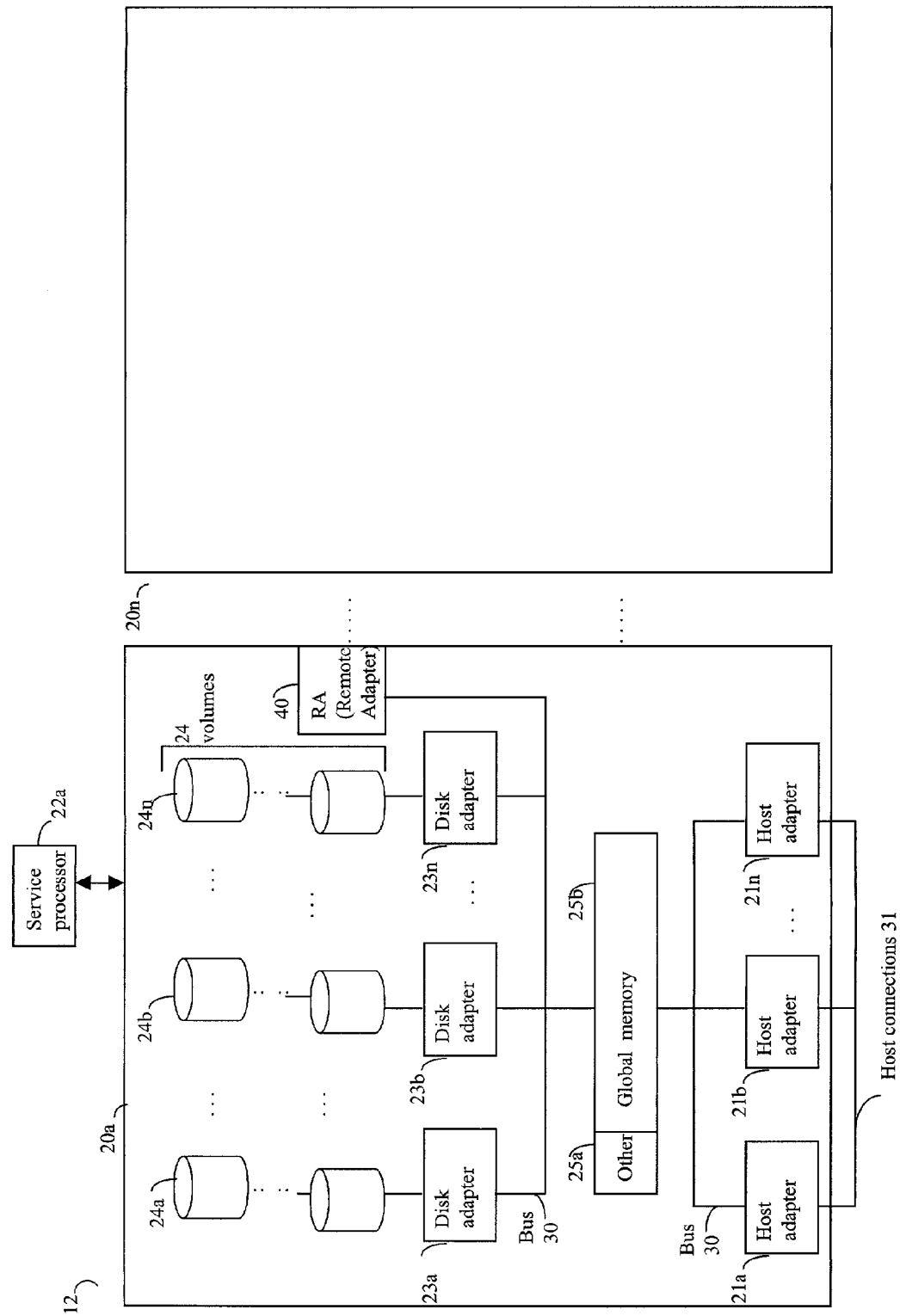
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a–20n as manufactured by EMC Corporation of Hopkinton, Mass. In this particular example, each of the Symmetrix™ storage systems 20a–20n may be interconnected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a–20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a–24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a–23n are connected, for example, by a bus 30 to a cache that includes a particular portion designated as global memory 25b. The DAs 23a–23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a–14n. This performance data may be gathered and stored, for example, in the global memory and/or other storage area.

The system 20a may also include one or more host adapters ("HAs") or directors 21a–21n. Each of these HAs may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations in connection with multiple LVs that may reside on a disk. The DA may accomplish this by creating job records for the different LVs associated with the particular DA. These different job records may be associated with the different LVs in a data structure stored and managed by each DA.

As described above, an embodiment may include a cache in the global memory portion 25b of FIG. 2. An embodiment may include a single or multiple replacement queue arrangement in the cache. An example of an embodiment that includes a cache using multiple replacement queues is described in pending U.S. patent application Ser. No. 09/535,134, entitled "Segmenting Cache to Provide Varying Service Levels", filed Mar. 24, 2000, and assigned to EMC Corporation of Hopkinton, Mass. An example of a system with a single cache memory is described in issued U.S. Pat. No. 5,381,539, Yanai et al., entitled "System and Method for Dynamically Controlling Cache Management", and also assigned to EMC Corporation of Hopkinton, Mass.

It should be noted that in an embodiment including a multiple replacement queue arrangement, there may be separate policies, decisions and data collections for one or more of the replacement queues in accordance with restrictions as to what devices use which of the replacement queues. This may vary with each embodiment.

Figure 3:
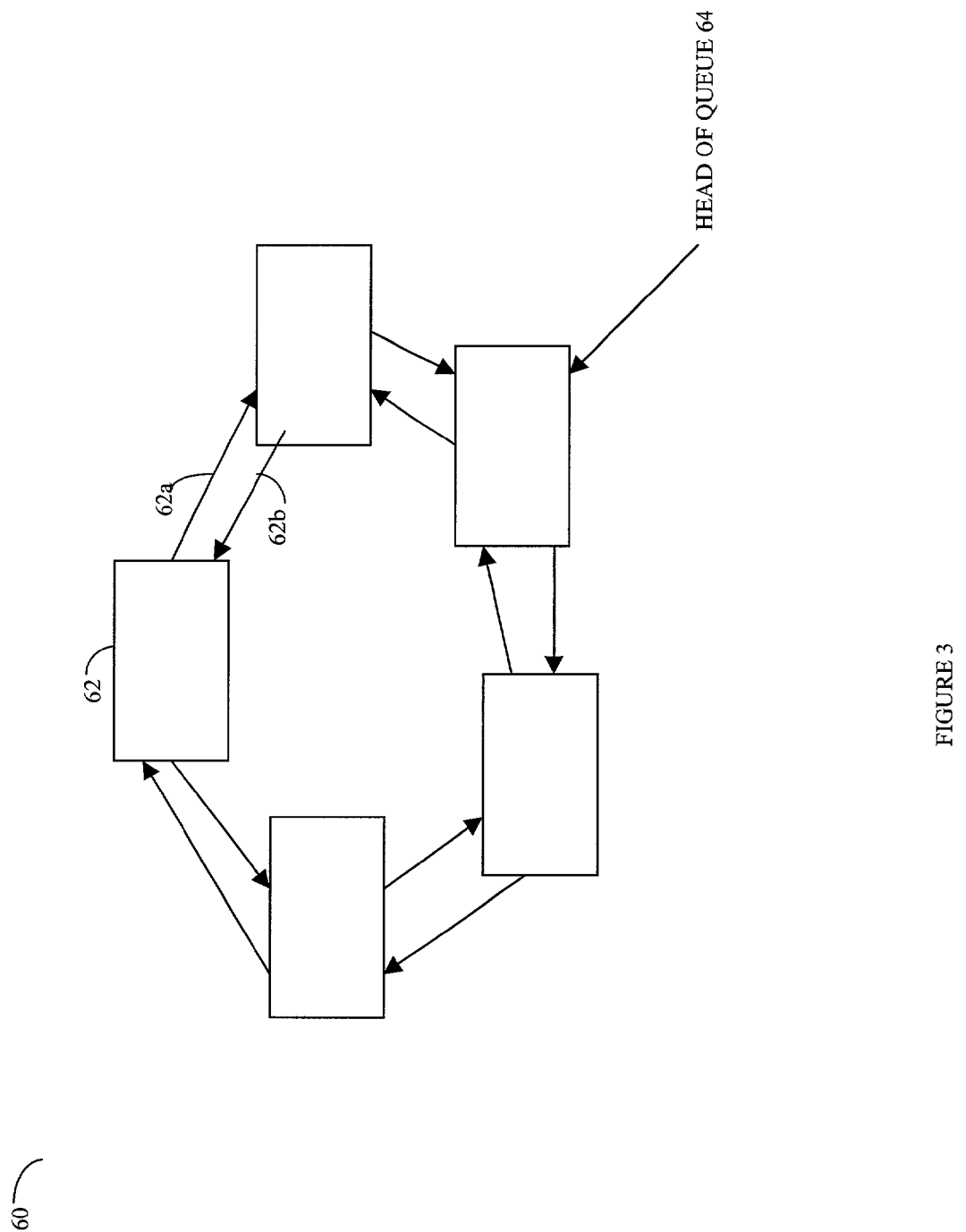
FIG. 3 is an example of an embodiment of a queue that may be used in implementing a cache.

Referring now to FIG. 3, shown is an example of an embodiment 60 of a replacement queue. Shown in the representation 60 is a circular structure in which each of the elements, such as 62, corresponds to a cache slot. Each cache slot may correspond to a portion of memory, such as one or more memory blocks. Each memory block may correspond to, for example, a track on one of the drives shown in connection with FIG. 2. In this representation, each of the slots are connected to other slots by forward and backward pointers, such as 62a and 62b, in a doubly linked list arrangement. Additionally, the head or beginning of the replacement queue is designated by a head pointer 64.

It should be noted that as described herein, an embodiment may include a cache which is in the form of the replacement queue using doubly linked list or other data structures known to those of ordinary skill in the art. The replacement queue described herein should not be construed as a limitation to the techniques described herein. Additionally, it should be noted that an embodiment may use a least-recently-used or other technique in determining which slots remain in the cache and which ones are removed.

Figure 4:
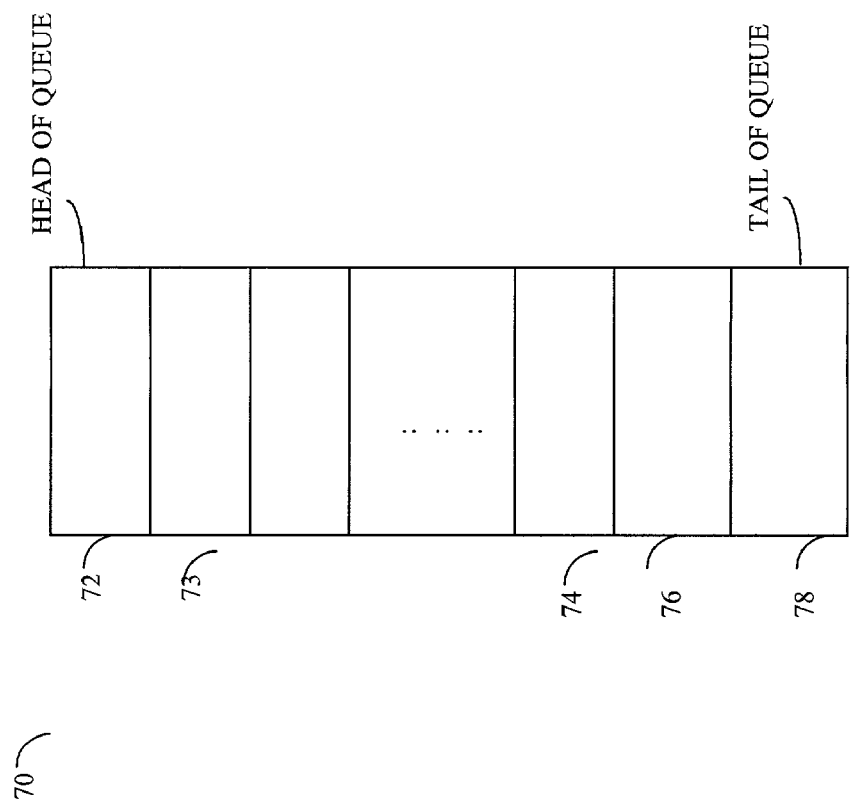
FIG. 4 is another representation of the queue of FIG. 3.

Referring now to FIG. 4, shown is an equivalent representation 70 of the previously described replacement queue 60 in connection with FIG. 3. The representation shown in FIG. 4 is a logical equivalent of the representation shown in FIG. 3. The representation 70 of FIG. 4 logically corresponds to that in FIG. 3 such that, for example, element 72 corresponds to the beginning cache slot as noted by the head of the replacement queue pointer 64 in connection with the previously described figure. Similarly, the last element of the replacement queue is denoted by slot 78 which in this example is labeled also as the tail of the replacement queue. Elements or slots may be inserted into the list at the head of the replacement queue and exit or leave the cache at the tail of the replacement queue. For example, when an element is deposited into the cache, it may be placed at the head of the replacement queue in slot location denoted by 72 in connection with a read operation. Additional elements may be progressively added to the head portion or other location within the replacement queue 72. As elements are added to the queue, subsequent elements progress toward the tail of the list. When another slot is added to the replacement queue at position 72, the slot currently at position 72 moves to that slot designated as position 73 and the newly added element falls into the position of element 72.

An element may be placed in the replacement queue, for example, when an element is referenced in connection with an I/O operation such as a cache miss for a read operation, or in connection with processing pending write operations, for example. Once in the replacement queue, an element progresses through the replacement queue from the head 72 towards the tail 78 of the replacement queue.

The foregoing queue arrangement in connection with a cache or shared memory may have drawbacks. For example, exclusive access to the queue may be implemented using a locking mechanism that only allows a single process to access the entire queue. Additionally, pointer manipulation in connection with performing management operations may also be expensive. These are described in more detail elsewhere herein.

Figure 5:
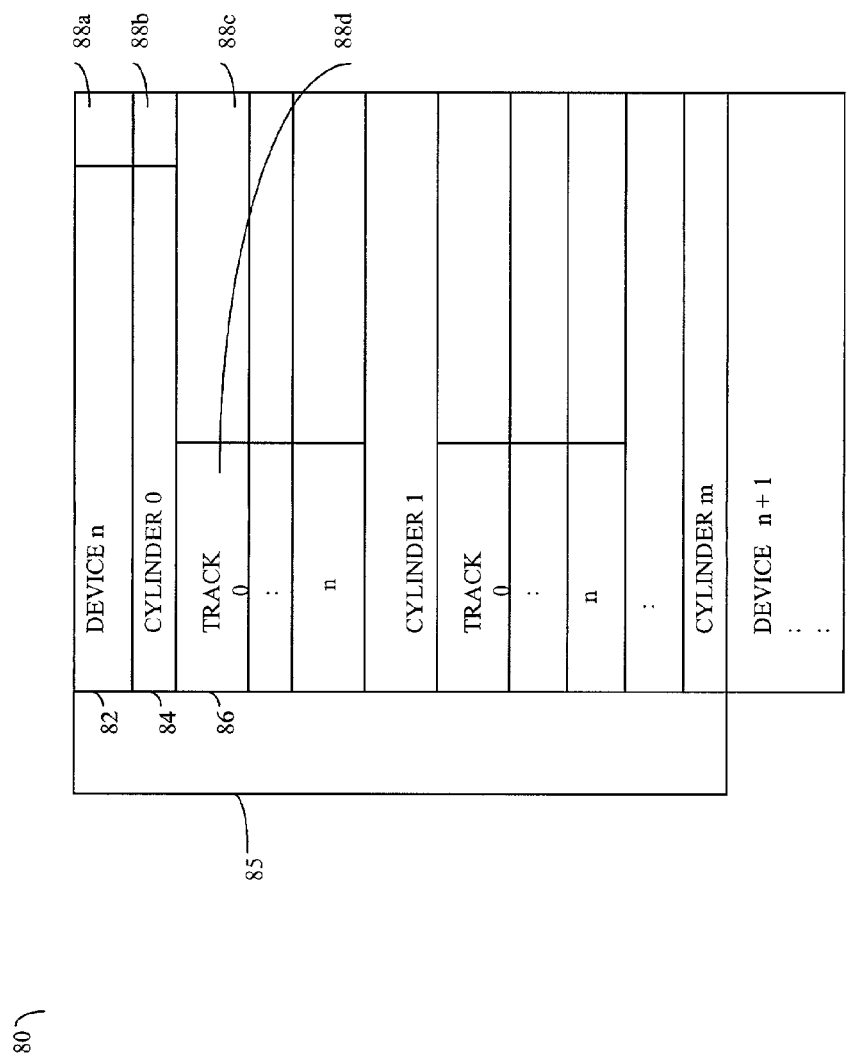
FIG. 5 is an example of an embodiment of a cache index or directory.

To indicate the data that is stored in the cache, a cache index or directory may be used. An embodiment may implement this using any one of a variety of different arrangements and structures. FIG. 5 shows one particular representation illustrating a device-by-device cache mapping.

Referring now to FIG. 5, shown is an example of a representation of a cache index/directory table. The table 80 may be organized on a device-by-device level to indicate for a particular portion of a device, is the portion in cache, and if so, where in cache is it located. An embodiment that includes devices, for example, such as disks, may include a further refinement or granularity in the table 80 corresponding to a location in cache.

The table 80 may include a hierarchical structure relative to the structure of a disk, such as cylinders and tracks on a disk. Each device, such as device n, may have a corresponding portion 85 included in the table. Each of the portions 85 may further be divided into sections in accordance with the disk structure. A portion 85 may include device header information 82, information for each cylinder 84 and for each track within each cylinder 86. For a device, a bit indicator 88a may indicate whether data associated with the device is stored in cache. The bit indicator 88b may further indicate for a particular cylinder within a device, is any data stored in the cache. Associated with each track may be a corresponding portion 88c indicating whether data associated with a particular track is in the cache and an associated address of where in the cache the data for a particular track may be found, for example, in connection with performing a read operation or a pending write operation. The portion 88d may include other information associated with a particular track, such as a valid cache address if data is stored in the cache for the particular track.

Figure 6:
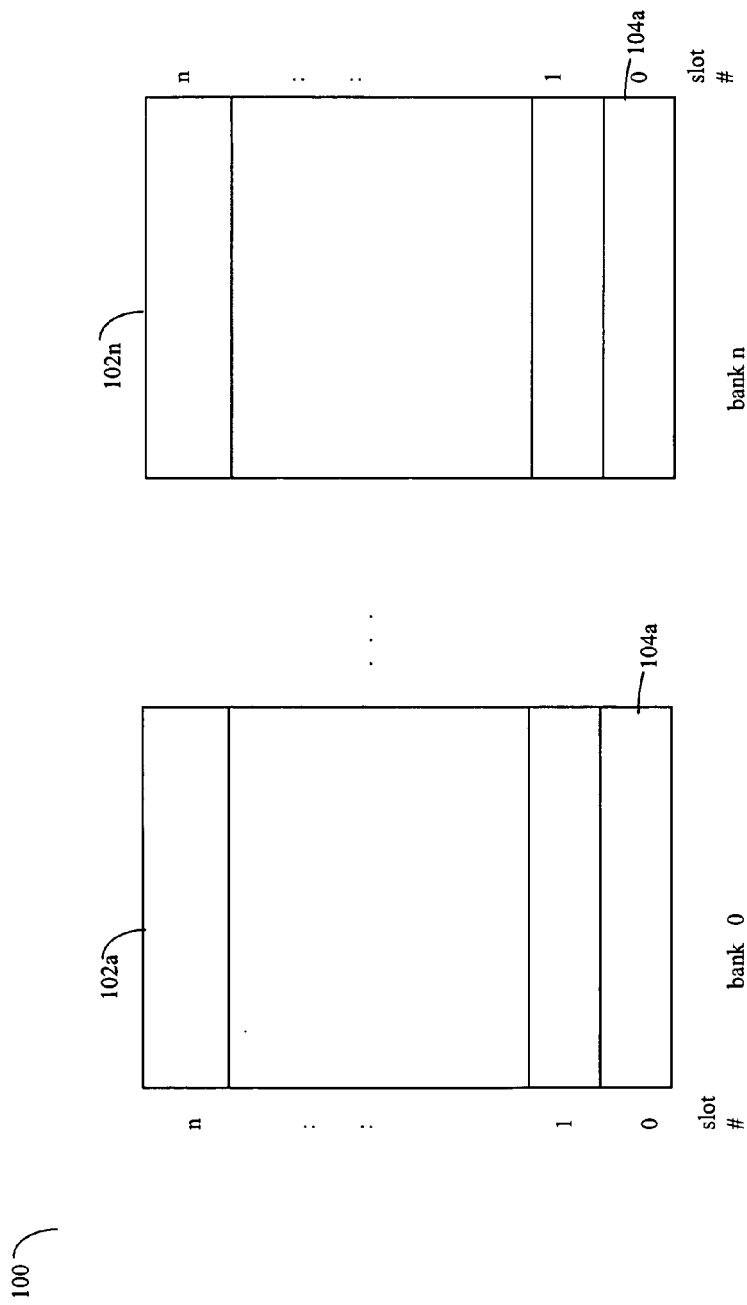
FIG. 6 is an example of an embodiment of a cache organization having a plurality of memory banks.

Referring now to FIG. 6, shown is an example of another representation of a cache in one embodiment. In this illustration, the cache 100 is organized into memory banks 102a–102n corresponding, respectively, to bank 0 through n. Each memory bank may be further divided into slots. Each memory bank, such as 102a, may include a control slot, such as 104a that includes information regarding the slots included in the respective memory bank.

It should be noted that the cache index or directory as shown in FIG. 5, for example, may be used in connection with any one or more of a variety of different cache arrangements, such as those in FIG. 3 as well as FIG. 6.

Figure 7:
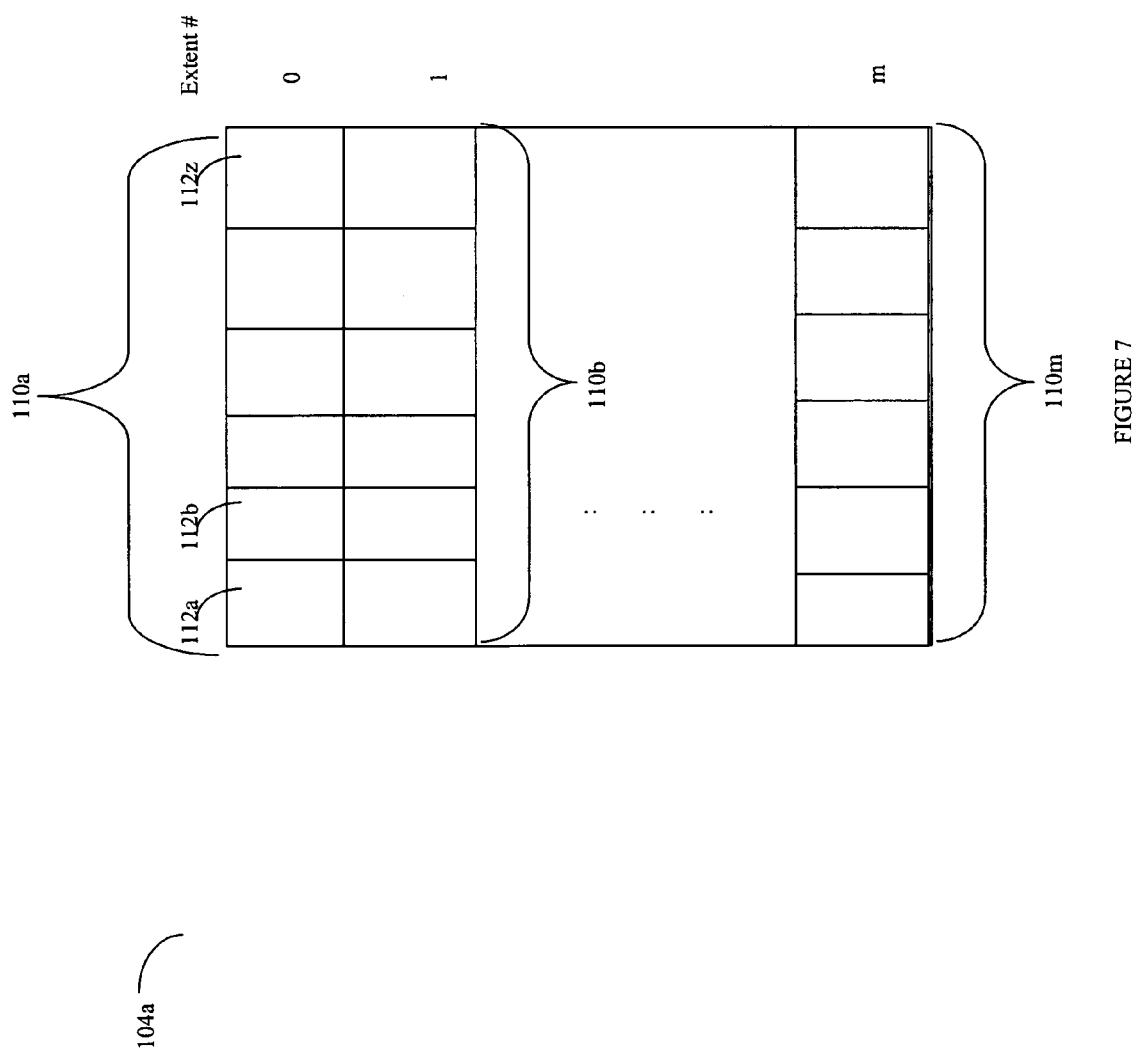
FIG. 7 is an example of an embodiment of a control slot associated with each memory bank.

Referring now to FIG. 7, shown is a more detailed description of the control slot 104a from FIG. 6. The control slot 104a may include information about the other slots in the memory bank. In this example, the control slot 104a may be further divided into extents or groups of tags, such as 110a–110m. Other slots in the memory bank 102a that includes control slot 104a may have a corresponding tag, such as 112a. In one embodiment, the tag size selected is 2 bytes or 16 bits. However, other tag sizes may be used in other embodiments. The tag may include information about the associated cache slot and is described in more detail in following paragraphs.

Each extent, such as 110a–110m, may refer to a number of tags that may vary in accordance with each embodiment. In one embodiment, the number of tags in an extent is the number of tags which may be read in a single direct memory access (DMA), for example, by a DA. Each chunk or portion may include, for example, 120 or 82 tags. Other numbers of tags may be associated with a single chunk or portion that may vary in accordance with each embodiment.

An embodiment may store the cache directory or table, cache, or portions thereof in global memory, for example, as included in FIG. 2 for a particular data storage system. Once in global memory, a DA may perform a DMA (direct memory access) and obtain a copy of a portion of the tags. The portion of the tags may be placed on another portion of memory local to the DA and utilization of this local copy is described in following paragraphs.

Figure 8:
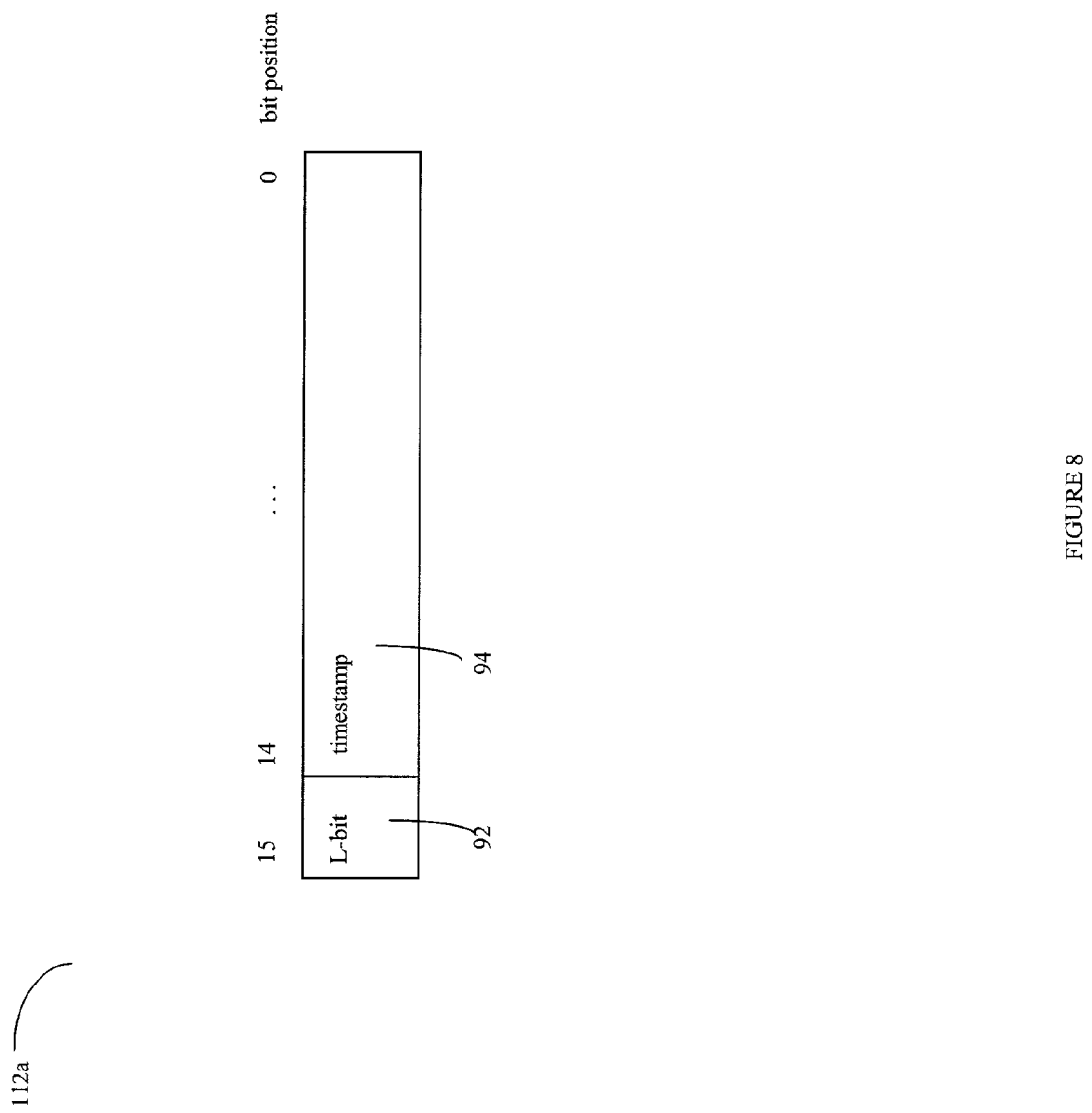
FIG. 8 is an example of a tag as included in the cache slot of FIG. 7.

Referring now to FIG. 8, shown is a more detailed representation of a tag 112a as included in FIG. 7. The 2 byte tag 112a includes an L-bit 92 and a 15 bit time stamp value 94. The L-bit, which may be the upper bit in the 2-byte tag arrangement, may be used to indicate the availability of a cache slot associated with the particular tag. This L-bit may be used in performing operations in which a processing step may be to obtain a cache slot. Associated processing operations are described in more detail elsewhere herein in following paragraphs. The time stamp value indicates, within a particular resolution, such as ½ second, when the associated slot was last used. For example, when there is a cache "hit" to a particular slot, the associated time stamp is updated with new time stamp value.

One technique may determine which slot to use, for example, by determining the age of each slot using the associated time stamp and selecting the oldest one. Additionally, an embodiment may also use a special time stamp value to indicate that a tag corresponds to a slot which is available and includes data that is not relevant. A tag corresponding to a slot including data that is not relevant may also be referred to as a scratch slot in a pool of available slots.

Data may be stored in the cache in connection with performing data operations. Different processing steps may be performed using the cache in connection with performing different data operations. For example, when a read request is received from a host computer, a determination may be made as to whether the requested data is in the cache. If so, the data is returned. Otherwise, the data may be read from the particular data storage device, stored in the cache and then sent to the host system. A slot from the cache is determined in which to store the data. When a write operation is performed, an embodiment may stored the data in the cache as a pending write which is actually written to memory at some later point in time in accordance with system specific policies. When the data is written to memory, a cache slot may be freed to be added to the pool of available or "free" slots. What will now be described are processing steps that may be performed in an embodiment in connection with cache management operations, for example, such as those just described for read and write operations.

Figure 9:
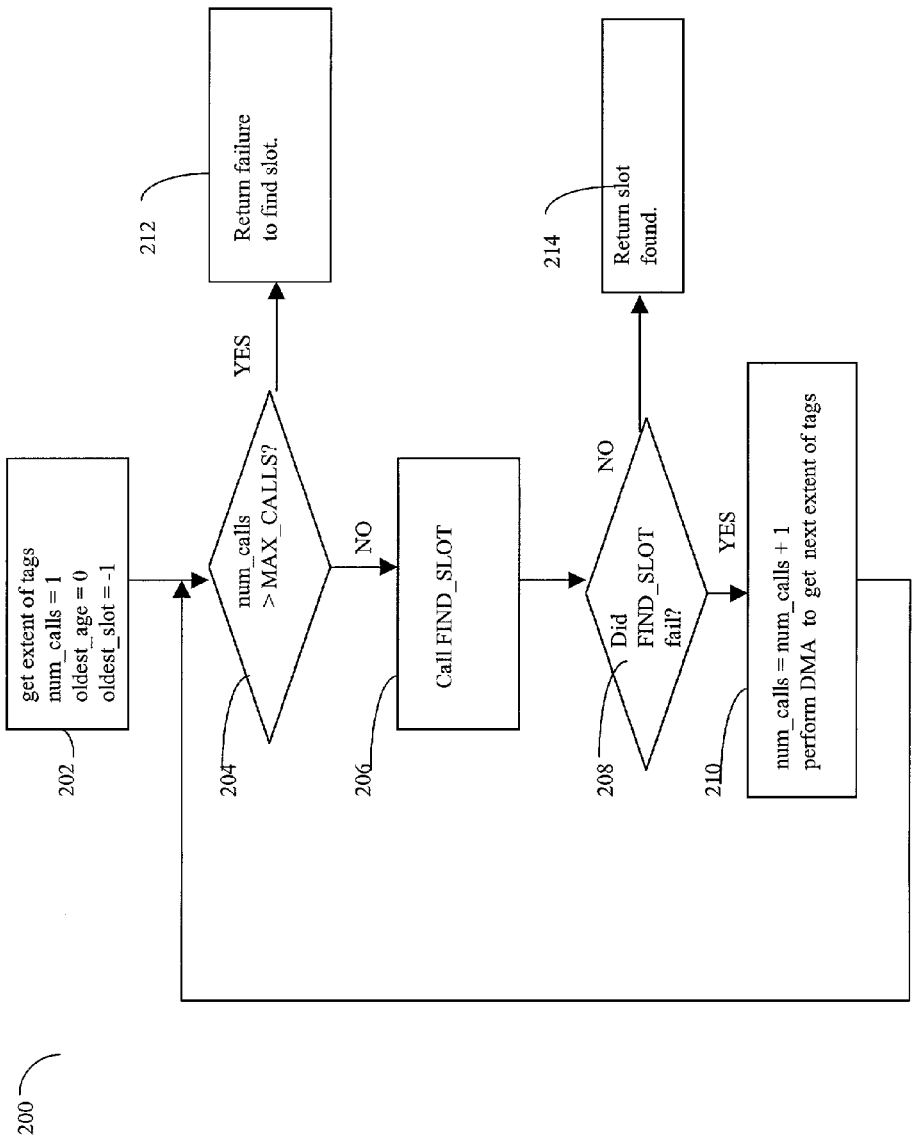
FIGS. 9–12 are flowcharts of processing steps of an embodiment for obtaining a cache slot.

Referring now to FIG. 9, shown is a flowchart of steps of an embodiment for obtaining a slot from the cache. Generally, the technique searches for an available slot or displaces the oldest slot. These steps may be performed by each DA or other processor, for example, within a system such as described in connection with FIG. 2.

At step 202, a first extent of tags is read from global memory and a local copy is made. Additionally, variable num_calls is initialized to 1, oldest_slot=−1 and oldest_age to 0. Num_calls tracks the number of times FIND_SLOT is called and fails after a predetermined number. Oldest_age tracks the age of the oldest slot and oldest_slot accordingly is an identifier corresponding to the oldest slot. Control proceeds to step 204 where a determination is made as to whether the number of calls exceeds a predetermined maximum, MAX_CALLS. If so, control proceeds to step 212 where a failure is returned. Otherwise, control proceeds to step 206 where a routine FIND_SLOT is called, which is described in more detail in following paragraphs. FIND_SLOT attempts to locate and return a cache slot for use. It should be noted that MAX_CALLS may be a predetermined value that may vary in accordance with each embodiment. For example, in one embodiment, MAX_CALLS is 100.

It should be noted that in connection with step 202, a new extent or portion of tags may be obtained with each invocation of steps of flowchart 200. Thus, each time each processor attempts to find a slot within an extent of tags, a new extent of tags is obtained. This technique may be used in connection with distributing the number of slots available for use in any particular extent to approximate a uniform distribution. It may be desirable to have a uniform distribution of the number of free slots in any particular extent. Using a new extent each time is one technique that may be used in connection with attempting to obtain the uniform distribution of slots available for use.

Additionally, when there are multiple processors each attempting to locate an available slot, techniques may be used in connection with determining the next subsequent extent of tags for each processor in order to minimize clustering. In other words, techniques may be used such that each processor attempts to locate an available slot from different extents of tags to minimize the likelihood that a first and a second processor look in the same extent of tags. Accordingly, these techniques may also minimize the likelihood that any two processors may be attempting to access the same available slot. Techniques for use with multiple processors, such as using a relative prime extent increment, are described elsewhere herein in more detail.

Experimentation by the inventors has shown that use of the foregoing techniques may result in a distribution of the number of free slots in any given extent of tags which approximates a uniform distribution as a best case and a normal distribution as a worst case.

Control proceeds to step 208 where a determination is made if FIND_SLOT succeeded or failed in locating a cache slot for use. If a slot is found, control proceeds to step 214 where the determined slot is returned. Otherwise, if FIND_SLOT failed, control proceeds to step 216 where num_calls is incremented by 1 and a global memory read is performed to get the next extent of tags. Control then proceeds to step 204 where processing then continues.

Figure 10:
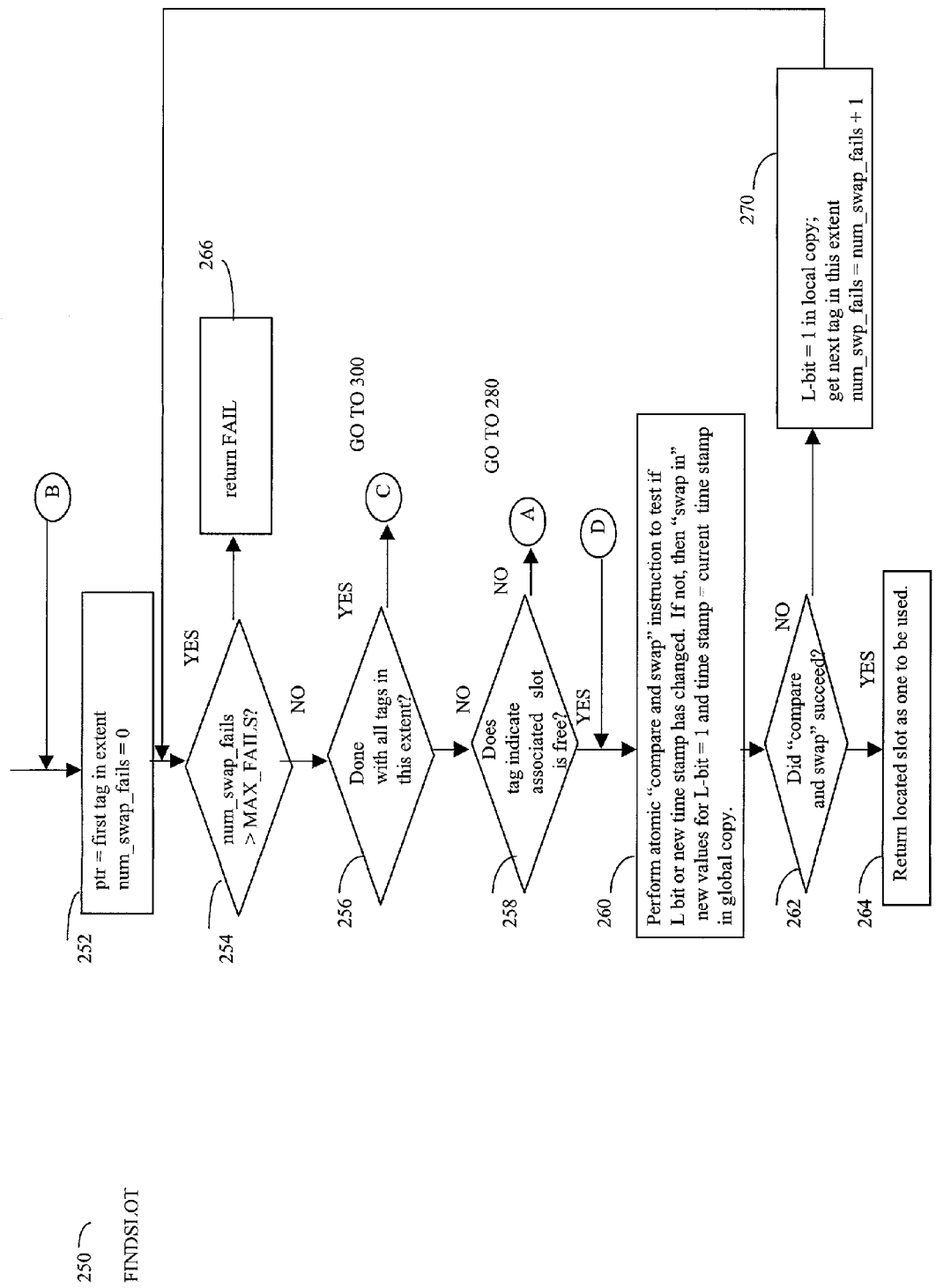

Referring now to FIG. 10, shown is a flowchart 250 of processing steps performed in connection with the FIND_SLOT routine. At step 252, ptr is assigned to point to the first tag in the current extent of tags. Additionally, the num_swap_fails tracking variable is initialized to 0. num_swap_fails counts the number of failed swaps as described in following paragraphs. At step 254, a determination is made as to whether num_swap_fails exceeds a predetermined maximum. In one embodiment, MAX_FAILS may be 4. Other embodiments may have other values for MAX_FAILS that may vary from that described herein. It should be noted that each DA, director or processor has its own unique ptr such that each DA, for example, may attempt to obtain a slot from locations different than that of other DAs. If a determination is made at step 254 that the maximum number of failed swap attempts has been exceeded, control proceeds to step 266 where failure is returned. Otherwise, control proceeds to step 256.

Figure 12:
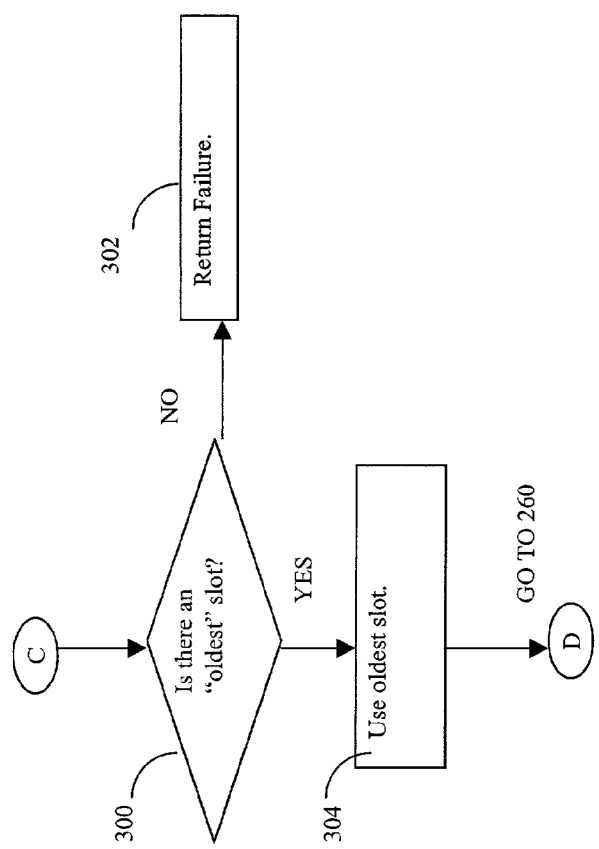

At step 256, a determination is made as to whether processing is complete for all tags in this extent. If so, control proceeds to step 300 in FIG. 12 where a determination is made as to whether there is an "oldest" slot. If so, this slot is used as the available slot, as in step 304, and control proceeds to step 260. Otherwise, control proceeds to step 302 where failure is returned.

If, at step 256, a determination is made that all tags in this extent have not been examined, in accordance with the local copy, control proceeds to step 258 where a determination is made as to whether the current slot identified by the current tag is free or available. In accordance with the embodiment described herein, this may be determined using the time stamp where a particular value may be placed in each time stamp field when a corresponding slot is returned to the pool of free or available slots. Any particular value may be used in an embodiment, such as a time stamp of 0, which may vary in accordance with each embodiment. If it is determined that the current slot is free, control proceeds to step 260 where an atomic operation may be performed. In one embodiment, this may be performed using an atomic "compare and swap" instruction which tests the L-bit and time stamp of the current tag to see if the values of either have changed since the determination at step 258. If the values have not changed, then the instruction also "swaps in" or updates values of the L-bit and time stamp fields by setting the L-bit to 1 and setting the time stamp to be that of the current time. It should be noted that this update of the current tag is performed to the copy in global memory. Additionally, the processing performed at step 260 is also performed using the copy from global memory.

Performing the compare and swap as an atomic, uninterrupted operation may be used to guarantee exclusive access to the shared resource of the cache or shared memory since, for example, multiple DAs may be attempting to access the same portion of shared memory, such as the same cache slot. The determination at step 258 may be performed, for example, by two different DAs reaching the same conclusion that a particular slot is available. However, only one of the DAs may actually be granted or obtain the slot since the atomic compare and swap operation may only be performed by one DA at a time in an uninterrupted fashion. The second DA's compare and swap will result in failure in that the values were changed by the first DA's successful execution of the compare and swap instruction.

The processing performed in connection with step 260 may be performed atomically using other instructions and/or techniques known to one of ordinary skill in the art, for example, in connection with accessing a shared resource such as the shared memory or cache as described herein. One example of the atomic performance or processing steps is the atomic "compare and swap" instruction which may be implemented in hardware and/or software. Another embodiment may utilize other techniques in performing an equivalent of this atomic operation by performing the following pseudo-code steps:

1. lock portion of shared resource
2. if L bit or time stamp has changed
   then FAIL and unlock shared resource
   else /*SUCCESS*/
      swap in new values as in step 260
      unlock shared resource The foregoing may be implemented used different mechanisms and techniques included in a system for providing exclusive access to a shared resource, such as the shared memory used as the cache in this instance.

It should be noted that the granularity used in connection with the lock and unlocking of a resource may vary in accordance with each particular embodiment. For example, in one embodiment, a locking mechanism may be provided which locks a minimum of a word size. Other embodiments may have other limitations. It may be desirable to lock for exclusive access the smallest amount or unit allowable within limits of a particular system which is also the size of a tag or portion thereof being accessed by multiple processors.

At step 262, a determination is made as to whether the compare and swap instruction succeeded. If so, control proceeds to step 264 where the located slot is returned as the one to be used. Otherwise control proceeds to step 270 where the L-bit is set in the local copy so that this slot is not examined again. The next tag is obtained in the current extent and the num_swap_fails is incremented by 1. Control proceeds to step 254.

Figure 11:
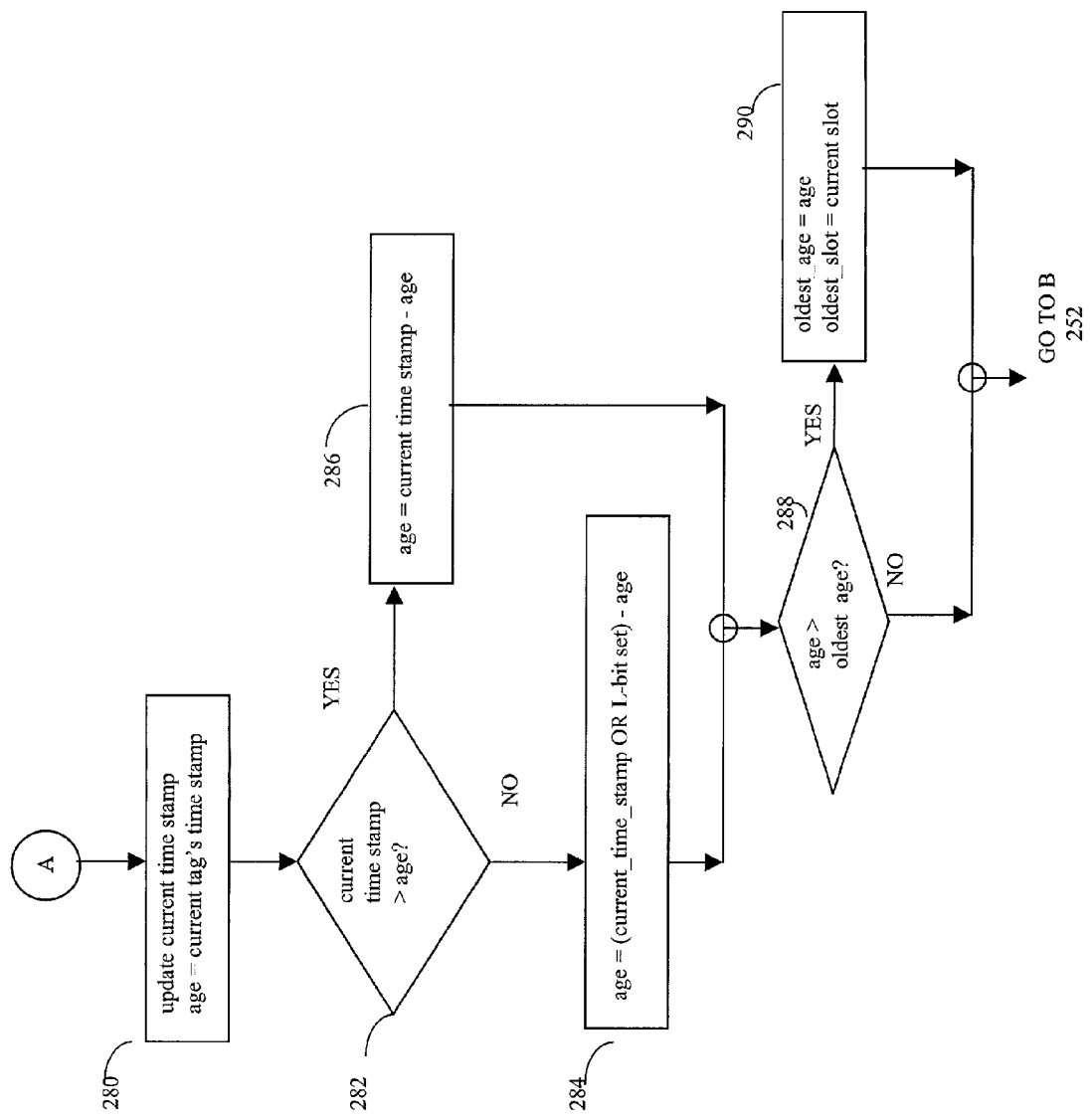

If a determination is made at step 258 that the current tag is not free, control proceeds to step 280 which is continued in FIG. 11. At step 280, the current time stamp is updated and the temporary variable age is assigned the current tag's time stamp value. It should be noted that the processing step of updating the current time stamp may be performed in any one of a variety of different increment units. For example, in one embodiment, current time stamp may be updated in increments of 4 units. In this example, multiple processors may be using the same cache in which each of the processors has its own clock and associated time used in connection with time stamps. Each of the processor clocks may have time synchronization differences such that at a particular point in time, time stamps produced by any two of the clocks may differ. A time stamp increment, such as 4 units, may be selected in accordance with any such synchronization differences when comparing or using time stamp values as in processing herein. In one embodiment, the increment is 4 units=2 seconds, each unit being ½ second. This increment amount may vary in accordance with embodiment.

At step 282, a determination is made as to whether the current time stamp is greater than the age. If so, control proceeds to step 286 where age=current time stamp−age. Otherwise, control proceeds to step 284 where age=(current time stamp OR L-bit set)−age.

The processing at steps 282, and 286 obtain an absolute value of the age of the current slot which is a difference of the amount of time from when the slot was last used subtracted from the current time. The processing of steps 282, 284 and 286 are used in connection with handling time stamp values which "wrap around" for very large values causing the L-bit to be set. When this point is reached, the age starts over at a new value similar to a counter which, when its maximum is reached, is reset.

Control proceeds to step 288 where a determination is made as to whether the age of the current slot is greater than the oldest_age of the slots visited thus far. If so, control proceeds to step 290 where information is retained about the current slot, such as updating the oldest_age and the corresponding identifier. Control then proceeds to step 252.

As data associated with a slot is moved in and out of cache, the cache index or directory, for example as illustrated in FIG. 5, may accordingly be updated.

It should be noted that in the foregoing embodiment using tags for cache management, a particular slot may be noted as "not available" is the L-bit is set (=1) in a global copy. A cache slot which is "not available" may be characterized as one that includes volatile data and should not be removed from the cache. Use of the L-bit as a technique for indicating when a slot is not available may be used to manage a shared cache, for example, rather than an using a cache implementation with linked lists and pointers as described elsewhere herein. Similarly, a slot may be indicated as "available" by clearing (=0) the L-bit. The associated time stamp may be set to any one of different values affecting when a particular slot may be selected for use. For example, the time stamp may be set to a value of 0 indicating that the data in the cache slot is invalid.

Adjusting the time stamp to different times may be used when freeing a cache slot, such as, for example, when setting the L-bit to 0. The time stamp may be set to a particular value to indicate an age of a slot. As described elsewhere herein, clearing the L-bit and resetting the time stamp to 0 in a global memory copy of a tag may be used to indicate that this slot should be selected prior to others having non-zero time stamps. A time stamp of zero in this instance may be used to indicate that the cache slot contains meaningless data. A non-zero time stamp may also affect when a particular cache slot is selected, for example, since the "oldest" cache slot may be selected from all time slots having non-zero time stamps. It should be noted that in a cache slot with an L-bit=0, a non-zero time stamp may be used to indicate that although the slot is "available", the slot does contain valid data that may also be used, for example, in connection with a write pending data portion that has been written out to disk and subsequently for some time the data still remains in the cache. Accordingly adjusting the time stamp may cause the age determination of the associated slot to vary. This technique may be used in connection with causing data in particular slots to remain in the cache for longer or shorter periods of time. This time stamp adjustment may be used, for example, as an alternative to physically inserting a slot at different points in a cache data structure, for example, such as in adjusting pointers in a linked list. Depending on techniques and policies that may be included in each embodiment, it may be desirable to have slots of data having particular characteristics remain in cache longer than other slots having other characteristics.

In particular, an embodiment may adjust the time stamp value of an associated slot in accordance with the Fall Through Time (FTT). Generally, the FTT refers to the average amount of time it takes for an unpromoted slot once it is in the queue to exit the queue. In other words, it is the average amount of time it takes a slot to pass through or "fall" through the queue from the head position and then exit out of the queue through the tail position, for example, referencing the illustration of FIG. 4. A slot may be added to the head position or at another position in accordance with the relative time stamps of those in the queue. The FTT is described in issued U.S. Pat. No. 5,592,432, Vishlitzky et al, which is incorporated herein by reference.

The FTT may be calculated for each slot by taking a first time stamp at the position when an element is lastly placed at the head of the replacement queue, and then taking a second time stamp value when that same slot exits the replacement queue (such as when a slot exits or leaves at the tail). The difference between the second ending time stamp value and the starting or first time stamp value for each particular slot may be used in calculating an average amount of time. It is this average amount of time that represents the FTT for a large number of slots.

It should be noted that in one embodiment of the foregoing, it was determined that the tags within each extent approximates a uniform distribution with respect to the time stamps.

An embodiment may provide different initial values for use with techniques described herein with different processors, for example, such as may be associated with a DA or other director. For example, in one embodiment, when determining the starting extent, each processor may begin with the first extent of a different memory bank. As additional extents are requested by each processor, a next subsequent extent may be obtained by updating the extent pointer address by an increment value also unique for each processor. For example, in one embodiment, each processor may have its own unique extent increment value and all the extent increments of all the processors may also be relatively prime. Additionally, the number of extents may not be a multiple of any prime number that is an increment extent value. The foregoing and other techniques may be used in an embodiment to minimize clustering of different processors in which different processors are attempting to obtain cache slots which are clustered together.

In one embodiment, each director or processor may have its own unique processor identifier number. This identifier number may be used in assigning an initial value for a starting extent for each processor. For example, each processor may be assigned an initial value of a starting extent number as follows:

```
for I=1 to max for all processors
{
   current_proc_id=identifier of processor I;
   initial_extent_value_processor_pointer[I]=
      (number of extents in all banks*current_proc_id)/
      (max number of
      processors)
   I=+1
}
``` where I is an index over the range of all processors and each processor has an associated unique processor identifier. The initial value of a starting extent for each processor is selected in accordance with the unique processor identifier. In this embodiment, the memory may be organized into banks and number of extents in all banks refers to the total number of extents in all of the memory banks. As described elsewhere herein, each memory bank may include a particular number of extents that may vary in accordance with each embodiment. Another embodiment may use the processor identifier in connection with determining a random number used in selecting an initial value for each processor's starting extent.

In addition to selecting an initial value of a starting extent for each processor, an extent increment may be determined for how to select the next extent for each processor. In one embodiment, this increment may be the next sequential extent for each processor, for example, determined by adding a constant of one (1) to a current extent number. Other embodiments may use different techniques in determining the initial value of a starting extent and for an extent increment.

An embodiment may also utilize thresholds levels of available slots such that there is a minimum number of available slots. For example, in one embodiment, when the number of available slots (L-bit=0) falls below 20%, write pending operations are actually written to disk causing the associated cache slots to have the L-bit values cleared.

An embodiment may also use the foregoing cache management technique in a system which provides for also utilizing an alternate technique for cache management. This may be implemented, for example, utilizing a switch providing for selection of the foregoing technique or another, such as cache management using pointer manipulation.

The foregoing provides a flexible and efficient technique for cache management. Slots may be added or removed from the cache by updating values in an associated tag. Other embodiments may utilize pointer management techniques in accordance with particular data structure of the associate cache that may be more expensive in terms of execution time and memory. Exclusive access to the shared resource of the cache may be implemented utilizing the atomic instruction described herein or other equivalent. This may be used as alternative for a more expensive locking mechanism, for example, that may exclude all others from accessing any portion of the cache. It should be noted that the atomic instruction does not exclude all other from accessing the cache but rather guarantees performance of an atomic operation to a portion of the cache. Use of the foregoing techniques described herein may be more apparent in a system, for example, having a large number of processors accessing the shared memory, or those with a slow global memory access time.

It should be noted that the foregoing includes techniques used in connection with a portion of shared memory used as a cache. These techniques may also be used in connection with other types of shared resources.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for cache management within a data storage system comprising:

associating a tag with each portion of a shared memory, said tag indicating availability of said each portion for use; and performing processing by a first process to obtain a first portion of said shared memory, said processing including:

making an initial determination, using a first tag associated with said first portion, as to whether said first portion is available or not available;

if said initial determination indicates that said first portion is available, subsequently determining whether said first tag has been modified since said initial determination, wherein if said subsequently determining determines that said first tag has been modified, said first portion has been granted to another process since said initial determination of availability and said first portion is not available, and if said subsequently determining determines that said first tag has not been modified, said first portion has not been granted to said another process since said initial determination of availability and is currently available, said another process also performing said processing to obtain a portion of said shared memory; and if said initial determination indicates that said first portion is available and said subsequently determining determines that said first tag has not been modified since said initial determination, updating said first tag to indicate that said first portion associated with said first tag is not available and that said first portion is being granted for said first process, wherein said subsequently determining and said updating are atomically performed.

2. The method of claim 1, wherein said subsequently determining and said updating are atomically performed using a single instruction.

3. The method of claim 1, wherein said computer system includes a plurality of processors each accessing said shared memory as a global resource and atomically performing said subsequently determining and said updating in providing access to said shared memory to said plurality of processors.

4. The method of claim 1, wherein said shared memory is divided into a plurality of slots, one of said plurality of slots being a control slot divided into groups of tags, each of said portions being one of said plurality of slots, each group including at least two tags.

5. The method of claim 4, wherein said shared memory is divided into a plurality of banks, each of said banks being divided into a plurality of slots.

6. The method of claim 4, further comprising:
obtaining one of said groups of tags with a single memory access.

7. The method of claim 6, further comprising:
obtaining a first of said groups of tags when attempting to locate a first available slot; and
obtaining a second different one of said groups of tags when attempting to subsequently locate a second available slot.

8. The method of claim 7, wherein a first processor and a second processor are each performing processing to locate an available slot, said first processor using a group of tags which is different from a group of tags used by said second processor, each group of tags used by the first and said second processors being determined in accordance with a technique to minimize a likelihood that said first and said second processors attempt to locate an available slot from a same extent of tags.

9. The method of claim 8, wherein said technique selects said third group of tags in accordance with a first unique extent increment associated with said first processor and a second unique extent increment associated with said second processor.

10. The method of claim 6, wherein each of said tags includes a bit value indicating whether an associated slot is available and a time stamp value indicating when data associated with said slot was last used.

11. The method of claim 10, further comprising:
updating said time stamp value when said data is referenced in connection with a read request.

12. The method of claim 10, further comprising:
if said initial determination by a first processor using said first tag is that a first slot is available and said atomically performing said subsequently determining and said updating fails, determining that another processor was granted said first slot for use.

13. The method of claim 12, further comprising:
if said atomically performing said subsequently determining and said updating fails, indicating in memory local to said first processor in a copy of said first tag associated with said first slot that said first slot is not available by setting said bit value of said first tag.

14. The method of claim 13, further comprising determining an available slot candidate as said first slot by determining one of a first available slot containing invalid data, and an oldest available slot containing valid data.

15. The method of claim 14, further comprising:
obtaining another group of tags if a slot is not found for use in accordance with predetermined criteria.

16. The method of claim 14, further comprising:
determining an age of a slot by adjusting a time stamp value of said slot such that older slots are selected for displacement from said shared memory prior to other younger slots.

17. The method of claim 16, further comprising:
selecting between at least two cache management techniques in accordance with a switch setting.

18. The method of claim 16, further comprising:
determining a threshold level of available slots; and
maintaining said threshold level by adjusting bit values in time stamps to 0.

19. A computer program product for cache management within a data storage system comprising machine executable code for:
associating a tag with each portion of a shared memory, said tag indicating availability of said each portion for use; and
performing processing by a first process to obtain a first portion of said shared memory, said processing including:
making an initial determination, using a first tag associated with said first portion, as to whether said first portion is available or not available;
if said initial determination indicates that said first portion is available, subsequently determining whether said first tag has been modified since said initial determination, wherein if said subsequently determining determines that said first tag has been modified, said first portion has been granted to another process since said initial determination of availability and said first portion is not available, and if said subsequently determining determines that said first tag has not been modified, said first portion has not been granted to said another process since said initial determination of availability and is currently available, said another process also performing said processing to obtain a portion of said shared memory; and
if said initial determination indicates that said first portion is available and said subsequently determining determines that said first tag has not been modified since said initial determination, updating said first tag to indicate that said first portion associated with said first tag is not available and that said first portion is being granted for said first process, wherein said subsequently determining and said updating are atomically performed.

20. The computer program product of claim 19, wherein said machine executable code for subsequently determining and updating are atomically performed using a single instruction.

21. The computer program product of claim 19, wherein said computer system includes a plurality of processors each accessing said shared memory as a global resource and atomically performing said subsequently determining and said updating in providing access to said shared memory to said plurality of processors.

22. The computer program product of claim 19, wherein said shared memory is divided into a plurality of slots, one of said plurality of slots being a control slot divided into groups of tags, each of said portions being one of said plurality of slots, each group including at least two tags.

23. The computer program product of claim 22, wherein said shared memory is divided into a plurality of banks, each of said banks being divided into a plurality of slots.

24. The computer program product of claim 22, further comprising:
machine executable code for obtaining one of said groups of tags with a single memory access.

25. The computer program product of claim 24, further comprising machine executable code for:
obtaining a first of said groups of tags when attempting to locate a first available slot; and
obtaining a second different one of said groups of tags when attempting to subsequently locate a second available slot.

26. The computer program product of claim 25, wherein a first processor and a second processor are each performing processing to locate an available slot, said first processor using a group of tags which is different from a group of tags used by said second processor, each group of tags used by the first and said second processors being determined in accordance with a technique to minimize a likelihood that said first and said second processors attempt to locate an available slot from a same extent of tags.

27. The computer program product of claim 26, wherein said technique selects said third group of tags in accordance with a first unique extent increment associated with said first processor and a second unique extent increment associated with said second processor.

28. The computer program product of claim 24, wherein each of said tags includes a bit value indicating whether an associated slot is available and a time stamp value indicating when data associated with said slot was last used.

29. The computer program product of claim 28, further comprising:
machine executable code for updating said time stamp value when said data is referenced in connection with a read request.

30. The computer program product of claim 28, further comprising:
machine executable code for determining that another processor was granted said first slot for use if said initial determination by a first processor using said first tag is that a first slot is available and said atomically performing said subsequently determining and said updating fails.

31. The computer program product of claim 30, further comprising:

machine executable code for indicating in memory local to said first processor in a copy of said first tag associated with said first slot that said first slot is not available by setting said bit value of said first tag if said atomically performing said subsequently determining and said updating fails.

32. The computer program product of claim 31, further comprising machine executable code for determining an available slot candidate as said first slot by determining one of a first available slot containing invalid data and an oldest available slot containing valid data.

33. The computer program product of claim 32, further comprising:
  machine executable code for obtaining another group of tags if a slot is not found for use in accordance with predetermined criteria.

34. The computer program product of claim 32, further comprising:
  machine executable code for determining an age of a slot by adjusting a time stamp value of said slot such that older slots are selected for displacement from said shared memory prior to other younger slots.

35. The computer program product of claim 34, further comprising:
  machine executable code for selecting between at least two cache management techniques in accordance with a switch setting.

36. The computer program product of claim 34, further comprising machine executable code for:
  determining a threshold level of available slots; and
  maintaining said threshold level by adjusting bit values in time stamps to 0.

37. A computer system comprising:
  a shared memory comprising at least one control slot of tags in which each of said tags corresponds to a portion of said shared memory indicating availability of said portion;
  a plurality of processors which access said shared memory, each processor accessing portions of said shared memory in accordance with availability of each of said portions indicated by an associated tag for each of said portions;
  machine executable code that performs an atomic operation providing exclusive access to said shared memory by a first of said plurality of processors when accessing a portion of said shared memory to update at least one field of a tag corresponding to said portion in order to update an availability status of said portion; and
  machine executable code that selects a portion of said shared memory for use in connection with a request, said machine executable code performs processing including:
    determining whether an available portion contains invalid data, said invalid data being indicated by a special value included in a tag associated with each portion; and
    if there are no available portions containing invalid data, subsequently determining an oldest available portion in accordance with a time stamp included in a tag associated with each portion, wherein an age associated with a portion is adjusted to affect a time period that data included in said portion remains in said shared memory.

38. The computer system of claim 37, wherein each tag includes a first bit field and a second time stamp field, said first bit field indicating whether an associated portion is available and said second time stamp field including said time stamp, said time stamp being adjusted in accordance with when data stored in said associated portion of shared memory was last used.

39. The computer system of claim 38, further comprising:
  a plurality of directors, each director associated with one of said plurality of processors, each of said plurality of directors being associated with a particular storage device.

40. The computer system of claim 39, wherein said shared memory comprises a plurality of memory banks, each of said plurality of memory banks including one of said control slots.

* * * * *